US008649882B2

(12) United States Patent
Stelzer et al.

(10) Patent No.: US 8,649,882 B2

(45) Date of Patent: Feb. 11, 2014

(54) UNIVERSAL LIGHTING SOURCE CONTROLLER WITH INTEGRAL POWER METERING

(71) Applicants: Joe Stelzer, London (GB); Kenneth Walma, Atlanta, GA (US); James Moan, Peachtree City, GA (US)

(72) Inventors: Joe Stelzer, London (GB); Kenneth Walma, Atlanta, GA (US); James Moan, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/765,318

(22) Filed: Feb. 12, 2013

(65) Prior Publication Data

US 2013/0154511 A1 Jun. 20, 2013

Related U.S. Application Data

(63) Continuation of application No. 12/466,077, filed on May 14, 2009, now abandoned.

(51) Int. Cl.
*G05B 11/01* (2006.01)
*G05F 1/00* (2006.01)

(52) U.S. Cl.
USPC .............................................. 700/22; 315/291

(58) Field of Classification Search
USPC .............. 700/22; 315/194, 297; 323/237, 300
See application file for complete search history.

(56) References Cited

U.S. PATENT DOCUMENTS

| | | | | |
|---|---|---|---|---|
| D183,395 | S | 8/1958 | Koch | |
| D297,405 | S | 8/1988 | Yandek | |
| D311,678 | S | 10/1990 | Graef | |
| 5,248,919 | A * | 9/1993 | Hanna et al. | 315/291 |
| 5,430,356 | A * | 7/1995 | Ference et al. | 315/291 |
| D378,814 | S | 4/1997 | Adams | |
| 5,789,869 | A * | 8/1998 | Lo et al. | 315/159 |
| D412,491 | S | 8/1999 | Mayo | |
| D422,567 | S | 4/2000 | Mayo | |
| D436,930 | S | 1/2001 | Butler | |
| D456,783 | S | 5/2002 | Mayo | |
| 6,724,180 | B1 * | 4/2004 | Verfuerth et al. | 324/142 |
| 7,098,611 | B2 * | 8/2006 | Chansky et al. | 315/294 |
| 7,667,408 | B2 * | 2/2010 | Melanson et al. | 315/209 R |
| 2008/0185978 | A1 * | 8/2008 | Jeong et al. | 315/297 |
| 2009/0146585 | A1 * | 6/2009 | Huang et al. | 315/294 |
| 2009/0189540 | A1 | 7/2009 | Huang et al. | |
| 2009/0218956 | A1 * | 9/2009 | Kaoh et al. | 315/291 |

* cited by examiner

*Primary Examiner* — Mohammad Ali
*Assistant Examiner* — Sivalingam Sivanesan
(74) *Attorney, Agent, or Firm* — King & Spalding LLP

(57) ABSTRACT

A universal lighting source controller including integral power metering for use with substantially all light source types including fluorescent, incandescent, magnetic low voltage, electronic low voltage, light emitting diode ("LED"), high density discharge ("HID"), neon, and cold cathode. The lighting source controller includes a line voltage dimming circuit that can control the intensity of light sources in a lighting circuit and measures the actual amount of power consumed by the light sources. The line voltage dimming circuit includes a triac circuit for controlling this intensity and current and voltage detection circuits for measuring the power consumption. The lighting source controller can also include low voltage dimming circuits to provide a control signal to light sources having electronic or magnetic dimming ballasts to set the intensity of these light sources.

32 Claims, 9 Drawing Sheets

UNIVERSAL LIGHTING SOURCE CONTROLLER WITH INTEGRAL POWER METERING

RELATED APPLICATION

This patent application is a continuation application of, and claims priority under 35 U.S.C. §120 to, U.S. patent application Ser. No. 12/466,077, entitled "Universal Lighting Source Controller With Integral Power Metering" and filed on May 14, 2009, which is fully incorporated by reference herein.

TECHNICAL FIELD

The invention relates generally to lighting source controllers, and more specifically to universal lighting source controllers having integral power metering.

BACKGROUND

A lighting source controller is an electronic device used to control one or more light sources, such as a fluorescent, incandescent, or light emitting diode (LED) lamp. A lighting source controller activates a light source based on various conditions including occupancy, desired use and time of day. A lighting source controller also controls the intensity of the light source to provide a dimming effect. One of the benefits of lighting control is that dimmed light sources consume less energy than lighting at full load. For this reason, lighting control has been used in various control schemes to reduce demand during peak energy demand times or simply to conserve energy on an ongoing basis.

Some programs supporting energy conservation, such as the Leader in Energy and Environmental Design (LEED) certification, require validation and measurement of actual energy usage to prove the lighting control systems are realizing reduced energy consumption. To meet this requirement, a separate energy metering system is typically employed to gather the required data. These systems are expensive as they require the design, installation, and maintenance of a second system.

Therefore, a need currently exists in the art for a lighting source controller that both controls and measures energy usage of light sources without the need for a separate energy metering system.

Many commercial and industrial buildings utilize more than one type of light source. For example, some buildings employ incandescent, fluorescent, and LED lamps, all in the same building. A conventional lighting source controller typically needs a separate control circuit or control card for each type of light source. This leads to higher costs incurred during the design of the lighting source controller and high maintenance costs for the lighting system. It also requires keeping more spare controller cards readily available, in case one of the controller cards needs replacement. Accordingly, a need also exists in the art for a lighting source controller circuit or controller card capable of controlling multiple types of light sources.

SUMMARY

The universal lighting source controller can include integral power metering capability for use with substantially all common types of light sources, including fluorescent, incandescent, magnetic low voltage, electronic low voltage, light emitting diode (LED), high-intensity discharge (HID), neon, and cold cathode.

The lighting source controller typically includes line voltage dimming cards for controlling and measuring power usage for a lighting circuit having one or more light sources. For example, a lighting control panel can include a single controller for the panel with multiple line voltage dimming cards, each line voltage dimming card controlling and metering energy usage for a lighting circuit with one or more lights. The controller can receive configuration information and control information for each of the dimming cards and communicate this information to the dimming cards. The controller can receive the configuration information from a user interface having a display and input devices. The controller can also receive control information from the user interface or from another device connected to the controller via a network. For example, the controller can be connected to a building management system via a network, such as Ethernet or RS485. This building management system can send commands to the controller to turn lighting circuits on or off and/or set dimming levels for the light sources in the lighting circuits.

The line voltage dimming cards can include a dimming circuit capable of controlling the intensity level for lights connected to the dimming card. This dimming circuit is universal and can be used with most common light sources, including fluorescent, incandescent, magnetic low voltage, electronic low voltage, LED, HID, neon, and cold cathode. The line voltage dimming card also can include voltage detection circuitry and current detection circuitry. A microprocessor in the line voltage dimming card can receive current and voltage measurements from the current sensor and voltage detection circuitry respectively and calculate the power usage of the lighting circuit controlled by the line voltage dimming card. The microprocessor can then communicate this power usage information to the controller, which in turn can output the power usage information on the user interface.

The lighting source controller can also include low voltage dimming cards capable of providing a dimming control signal to light sources having electronic or magnetic dimming ballasts. For these light sources, a line voltage dimming card can be used to provide power for the light sources and to measure the power usage of the light sources, while a low voltage dimming card can be used to provide the dimming control. The low voltage dimming card can provide common ballast dimming control signals, including 0-10 VDC, 1-10 VDC, and digital dimming control signals.

The controller can receive power usage information from each of the line voltage dimming cards and communicate this information to the user interface or to a remote computer for display. The controller can also calculate additional information for display to a user, such as the amount of power being used for each phase of a three phase system and the total amount of power consumed for all circuits connected to the controller.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description, in conjunction with the accompanying figures briefly described as follows.

DETAILED DESCRIPTION OF EXEMPLARY EMBODIMENTS

Figure 1:
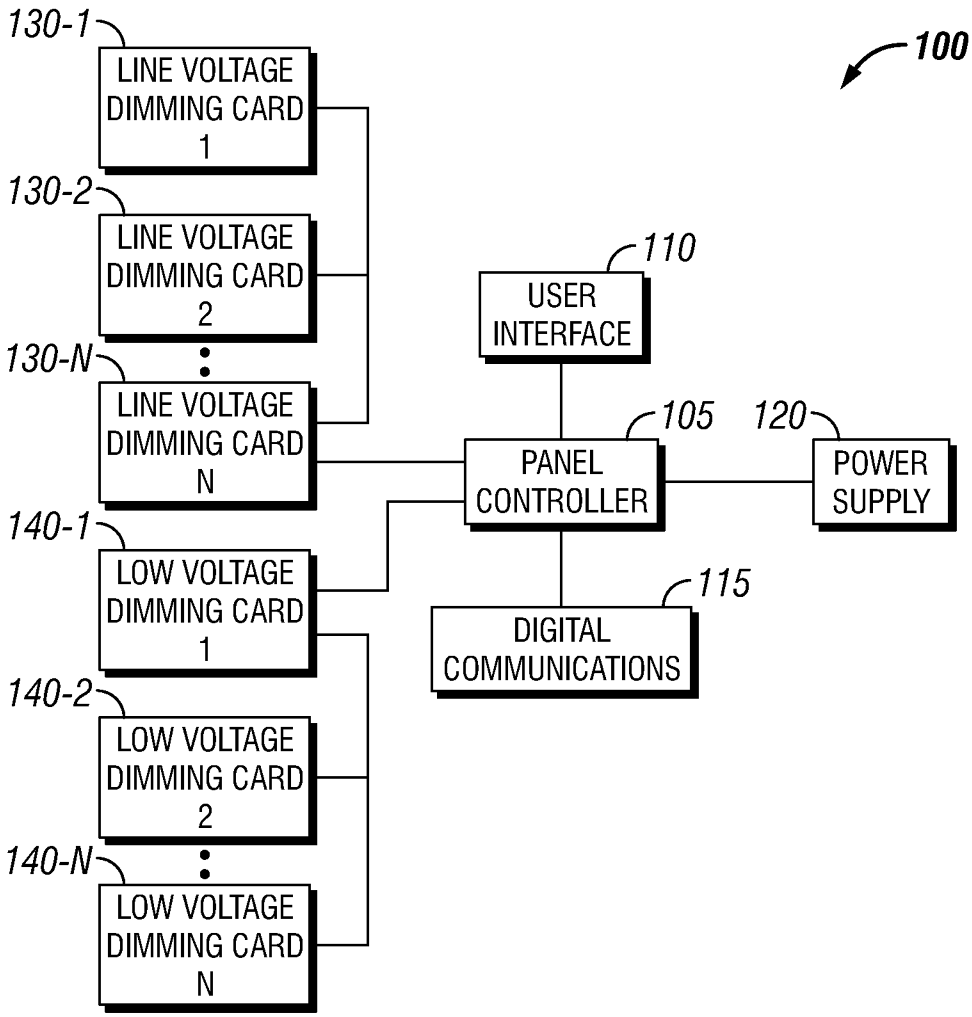
FIG. 1 is a block diagram depicting a universal lighting source controller having integral power metering in accordance with one exemplary embodiment of the present invention.

The following description of exemplary embodiments refers to the attached drawings, in which like numerals indicate like elements throughout the figures. FIG. 1 is a block diagram depicting an exemplary universal lighting source controller 100 having integral power metering in accordance with one exemplary embodiment of the present invention. The lighting source controller 100 controls and meters power usage for substantially all types of light sources, including fluorescent, incandescent, magnetic low voltage, electronic low voltage, light emitting diode (LED), high-intensity discharge (HID), neon, and cold cathode.

In this exemplary embodiment, the lighting source controller 100 includes a panel controller 105 for controlling and metering the power usage of multiple lighting circuits from a single lighting panel (not shown). The panel controller 105 is in electrical communication with a user interface 110, a digital communications module 115, one or more line voltage dimming cards 130 and one or more low voltage dimming cards 140. The panel controller 105 also receives power from a power supply 120 and provides supply power to each of the line voltage dimming cards 130 and each of the low voltage dimming cards 140.

The panel controller 105 receives input from users and provides information to users via the user interface 110. The user interface 110 can be presented on a variety of displays including a liquid crystal display (LCD), a computer monitor, or a touchscreen. In certain exemplary embodiments, a user configures the panel controller 105, the line voltage dimming cards 130, and the low voltage dimming cards 140 using input devices, such as a pointing device or keypad coupled to the user interface 110. The user interface 110 communicates this configuration information to and receives information from the panel controller 105 via various interfaces, including, for example, Ethernet, Universal Serial Bus (USB), and RS485.

The digital communications module 115 provides for electrical communication between the panel controller 105 and various other systems or computers via a network. For example, in one exemplary embodiment, the digital communications module 115 includes an Ethernet interface that provides control of light sources from a building management system and provides diagnostics and monitoring capabilities from a remote computer. Other non-limiting examples of communication protocols that can be provided by the digital communications module 115 include RS485 and DMX512 (e.g. control by entertainment systems) serial communication protocols.

The lighting source controller 100 includes any number of line voltage dimming cards 130 and low voltage dimming cards 140. Each line voltage dimming card 130 controls and meters the power usage of a lighting circuit having one or more light sources. The line voltage dimming cards 130 are universal and are used with various types of light sources, including fluorescent, incandescent, magnetic low voltage, electronic low voltage, LED, HID, neon, and cold cathode. For example, the same line voltage dimming card 130 can be removed from a lighting circuit of incandescent lights and installed in a lighting circuit of fluorescent lights without any hardware modifications.

The line voltage dimming cards 130 receive configuration and control information from the panel controller 105 and provide the panel controller 105 with the power usage information for its lighting circuit. In one exemplary embodiment, the configuration information varies based on the lighting supply power and desired control scheme and includes parameters such as a high power limit, low power limit, a setting for turning the lighting source off when input power is below the low power limit or stay on at low limit, and a setting for transient response between the high and low power limits, such as linear, square law, or switched only. The configuration information also includes a setting for scaling the transient response based on the high and low power limits. In one exemplary embodiment, these parameters are received from a user via the user interface 110. Alternatively, the configuration information is received from a remote computer via the digital communications module 115.

A user programs the panel controller 105 to communicate with the line voltage dimming cards 130 to activate a lighting circuit and control the intensity or dimming of the light sources in the circuit based on various factors, including time of day, occupation of area, desired use, and amount of lighting present in the area. Alternatively, the panel controller 105 receives control information from an outside source, such as a building management system or an entertainment system.

As discussed in more detail below with reference to FIG. 2, each line voltage dimming card 130 includes a microprocessor for controlling the light sources for its respective lighting circuit. The microprocessor also receives power usage information for the lighting circuit provided by one or more voltage detection circuits and a current detection circuit. This power usage information is communicated to the panel controller 105 and outputted at the user interface 110 and optionally at a remote computer via the digital communications module 115.

The low voltage dimming cards 140 provide a dimming control signal to light sources having an electronic or magnetic dimming ballast. Examples of light sources having electronic dimming ballasts include analog fluorescent (2, 3, or 4-wire), LED, and HID dimmable loads. Typically, these electronic dimming ballasts control the intensity level of a light source based on an analog voltage or current range, such as a 0-10 VDC input signal. Additionally, some electronic dimming ballasts control the intensity level of the light source based on a digital signal. The low voltage dimming cards 140 provide either an analog or digital dimming control signal to the light sources in a lighting circuit.

Similar to the line voltage dimming cards 130, the low voltage dimming cards 140 receive configuration and control information from the panel controller 105. The configuration information for the low voltage dimming cards 140 varies based on the type of ballast and control scheme and includes parameters such as a low voltage high end limit (e.g. 10 VDC), a low voltage low end limit (e.g. 0 VDC), a setting for coordinating the low voltage limit and power switching (e.g. always energized or turn off below low end limit), and a setting for the direction of the low voltage control (i.e. proportional or inverse). Additionally, in certain exemplary embodiments, the configuration information also includes a setting for transient response between the low voltage limits, such as linear, square law, or switched only, and a setting for scaling the transient response according to the high end and low end voltage limits.

A user programs the panel controller 105 to communicate with the low voltage dimming cards 140 to control the intensity or dimming of the light sources in the circuit based on various factors, including time of day, occupation of area, desired use of the area, and amount of lighting present in the area. Alternatively, the low voltage dimming cards 140 receive control information from an outside source, such as a building management system or an entertainment system as discussed above. In one exemplary embodiment, the low voltage dimming cards output a dimming control signal, such as 0-10 VDC, to a lighting circuit based on the desired dimming level.

The exemplary lighting source controller 100 includes a corresponding line voltage dimming card 130 for each low voltage dimming card 140 used to control light sources having electronic or magnetic dimming ballasts. The corresponding line voltage dimming card 130 provides power for and measures power usage of the light sources, while the low voltage dimming card 140 provides a dimming control signal for adjusting the intensity of the light sources.

Figure 2:
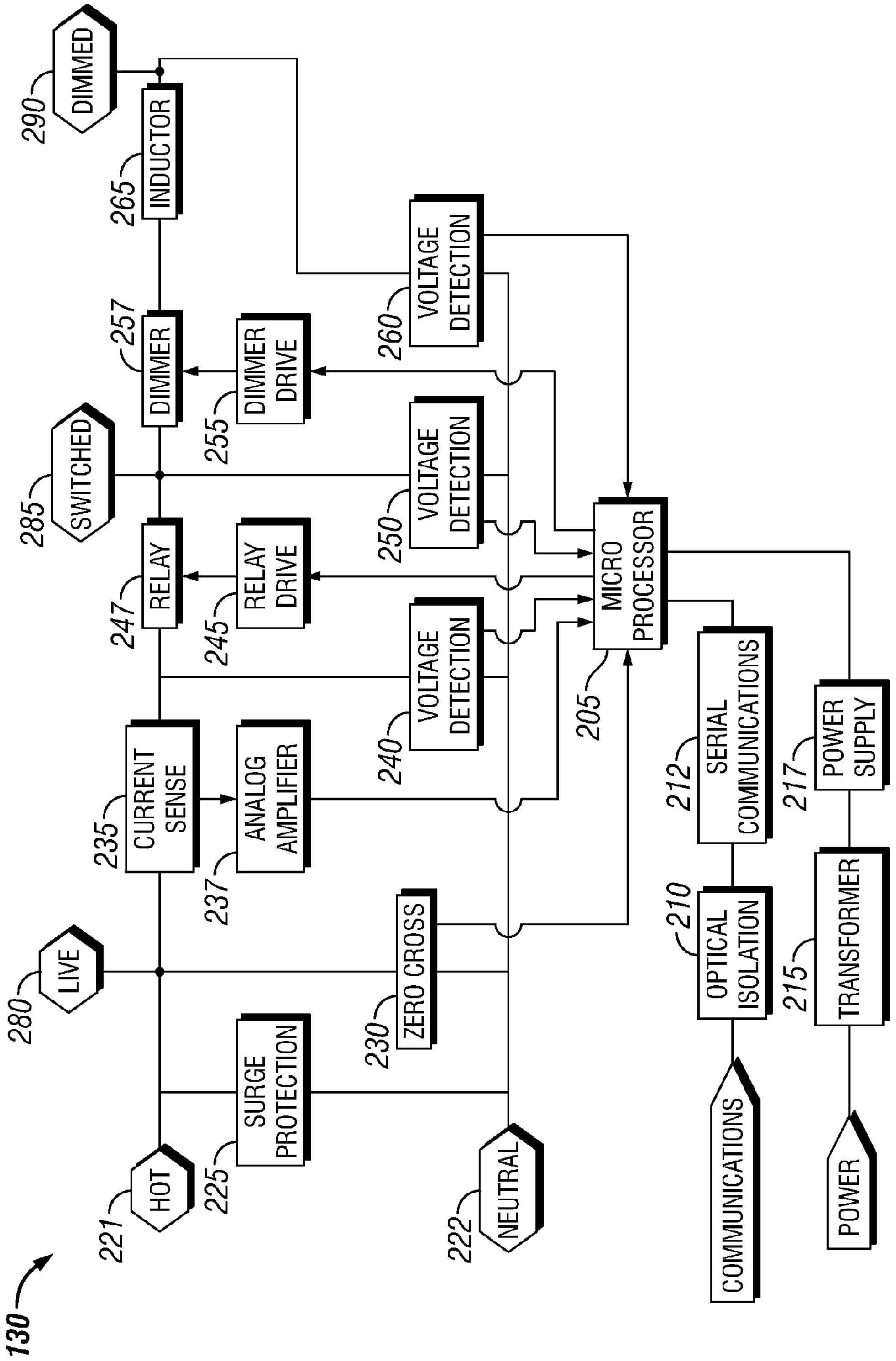
FIG. 2 is a block diagram depicting a line voltage dimming card in accordance with one exemplary embodiment of the present invention.

FIG. 2 is a block diagram depicting a line voltage dimming card 130 in accordance with one exemplary embodiment of the present invention. This exemplary line voltage dimming card 130 includes a microprocessor 205 and circuitry for activating, dimming, and measuring power usage of a lighting circuit having one or more light sources. The circuits of the line voltage dimming card 130 are discussed below with reference to FIG. 2 and an exemplary circuit diagram for each circuit is also discussed below with reference to FIGS. 3-9. It should be noted that these circuit diagrams are exemplary and can be modified without departing from the scope and spirit of the invention. It should also be noted that the values for the components in each of the circuit diagrams are also exemplary and can be modified and in some cases, the components can be removed or other components added without departing from the scope or spirit of the invention.

Referring to FIGS. 1 and 2, the microprocessor 205 receives power from the panel controller 105 via a transformer 215 and a power supply 217. The transformer 215 adjusts the voltage level of the input power and the power supply 217 converts the input alternating current (AC) power into direct current (DC) power and provides a steady DC voltage to the microprocessor 205.

The microprocessor 205 also receives configuration and control information from the panel controller 105 as described above with reference to FIG. 1. In this exemplary embodiment, the panel controller 105 communicates this information to the microprocessor 205 via a serial communications circuit 212, although many other communication protocols are possible as would be known to one or ordinary skill in the art having the benefit of this disclosure. The microprocessor 205 also utilizes this serial communications circuit 212 to send the panel controller 105 information including power usage information for the lighting circuit that the line control dimming card 130 is controlling. The serial communications circuit 212 and the microprocessor 205 are electrically isolated from the panel controller 105 by an optical isolation circuit 210.

The line voltage dimming control card 130 receives power for its lighting circuit from a hot power line 221 and a neutral power line 222 and outputs power onto three separate power lines, a live power line 280, a switched power line 285 and a dimmed power line 290 depending on the configuration of the lighting circuit. For example, if light dimming is not desired, the line voltage dimming card 130 is used to switch the light sources on and off In this example, the lighting circuit is connected to the switched power line 285. If dimming is desired, the lighting circuit is connected to the dimmed power line 290. Additionally, the live voltage power line 280 is provided for an emergency non-switched lighting connection.

The line voltage dimming card 130 includes a surge protection circuit 225 for diverting or suppressing a spike in input voltage. In one exemplary embodiment, the surge protection circuit 225 is positioned near the entry point of the input voltage to protect other circuits in the line voltage dimming card 130. Various types of surge protection circuits 225 can be used with the line voltage dimming card 130, including metal oxide varistor circuits and suppression diode circuits.

The line voltage dimming card 130 also includes a zero cross circuit 230 for detecting transitions between positive and negative voltage levels of the input AC voltage. At each transition, the zero cross circuit 230 provides a short electrical pulse to the microprocessor 205. This series of pulses resembles a square wave signal which is used by the microprocessor 205 to time the energizing and de-energizing of the light sources in a dimming application.

A current sensor 235 and an analog amplifier 237 are provided with the line voltage dimming card 130 to measure the current flow through the line voltage dimming card 130 and thus, through the lighting circuit it controls. This current measurement is taken along the hot power line 221 and is provided to the microprocessor 205.

This exemplary line voltage dimming card 130 also includes three separate voltage detection circuits 240, 250, 260. The voltage detection circuit 240 measures the voltage level across the live voltage point 280 and the neutral power line 222. The voltage detection circuit 250 measures the switched output voltage level across the switched point 285 and the neutral power line 222 downstream from a relay 247. The voltage detection circuit 260 measures the dimmed voltage level across the dimmed point 290 and the neutral power line 222. In one exemplary embodiment, each voltage detection circuit 240, 250, 260 provides the microprocessor 205 with its respective voltage measurement.

The microprocessor 205 determines the amount of power that its lighting circuit is consuming using the current measurement provided by the current sensor 235 and a voltage measurement from one of the voltage detection circuits 240, 250, 260 depending on the configuration or application of the line voltage dimming card 130. For example, if the line voltage dimming card 130 is used in a dimming application, the microprocessor 205 uses the voltage measurement from the voltage detection circuit 260. In an alternative exemplary embodiment when the line voltage dimming card 130 is used in a switched (non-dimming) application, the voltage measurement from the voltage detection circuit 250 is used. Additionally, in emergency lighting applications, the voltage measurement from the voltage detection circuit 240 is used. The microprocessor 205 communicates this power calculation to the panel controller 105 for display at the user interface 110 or at a remote computer via the digital communications module 115.

The line voltage dimming card 130 includes a relay 247 for passing or blocking electrical power along the hot power line 221 to the light sources of the lighting circuit. The microprocessor 205 activates the relay 247 to energize the lighting loads by sending a control signal to a relay drive 245, which in turn energizes a coil in the relay 247. Although a relay 247 is utilized in this exemplary embodiment, other suitable switching devices can be used as would be known by one of ordinary skill in the art having the benefit of the present disclosure.

The line voltage dimming card 130 also includes a dimming circuit having a dimmer 257, a dimmer drive 255, and an inductor 265. In one exemplary embodiment, for light sources that do not have an electronic or magnetic dimming ballast, the microprocessor 205 sends electrical signals to the dimmer drive 255, which in turn, controls the dimmer to provide a dimming level to light sources based on control information received from the panel controller 105. As discussed in more detail below with reference to FIG. 7, the dimmer 257 includes a triac that is activated and deactivated at high frequencies to turn the light sources on and off at a high frequency. This reduces the total amount of energy delivered to the light sources and therefore, reduces the intensity of the light. This dimming level is adjusted by changing the frequency of the activation of the triac in the dimmer 257. In one exemplary embodiment, the timing of the activation and deactivation of the triac is synchronized with the zero cross signal by the microprocessor 205.

Figure 3:
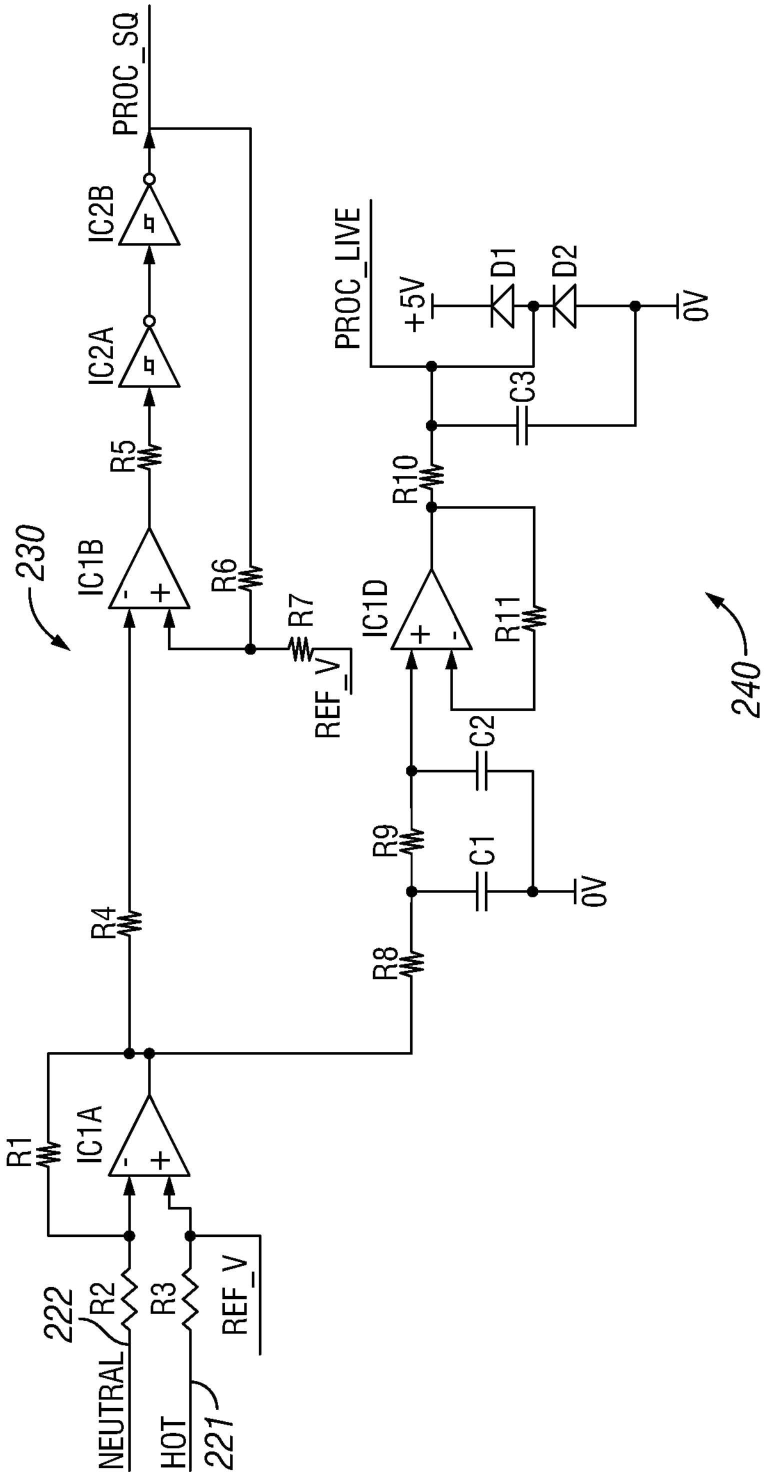
FIG. 3 is an electrical circuit diagram depicting a zero cross circuit and a voltage detection circuit of a line voltage dimming card in accordance with one exemplary embodiment of the present invention.

FIG. 3 is an electrical circuit diagram depicting an exemplary zero cross circuit 230 and an exemplary voltage detection circuit 240 of a line voltage dimming card 130 in accordance with the exemplary embodiment of FIG. 2. An operational amplifier ("op-amp") IC1A receives AC voltage across the hot 221 and neutral 222 lines of a lighting circuit and provides a scaled AC signal to the zero cross circuit 230 and the voltage detection circuit 240. In this exemplary embodiment, the op-amp IC1A and its associated circuitry works to scale the input AC signal to an output range of 0-5 VAC. A reference voltage REF_V of 2.5 VAC is provided at the non-inverting input of the op-amp IC1A to provide a bias voltage at the midrange of the scaled output range.

The zero cross circuit 230 converts the AC signal to a square-wave signal PROC_SQ with peaks corresponding to transitions of the AC signal through zero volts. This square wave signal PROC_SQ is transferred to an input of the microprocessor 205 for use in timing the activation and deactivation of light sources in a dimming application. This exemplary zero cross circuit 230 includes an op-amp IC1B, two inverting Schmitt triggers IC2A, IC2B connected in series at the output of the op-amp IC1B, and associated resistors and capacitors. Exemplary values for the components of the zero-cross circuit 230 and for components associated with op-amp IC1A are listed below in Table 1.

TABLE 1

Exemplary Component Values for the Zero Cross Circuit 230 and Components Associated with Op-Amp IC1A

| Circuit Component | Value |
|---|---|
| R1 | 4.7 kΩ |
| R2 | 990 kΩ |
| R3 | 990 kΩ |
| R4 | 4.7 kΩ |
| R5 | 100 kΩ |
| R6 | 1 MΩ |
| R7 | 10 kΩ |

The voltage detection circuit 240 scales the AC signal received from the op-amp IC1A and provides this scaled signal PROC_LIVE to the microprocessor 205. The microprocessor 205 can then compare this scaled signal PROC_LIVE to a reference voltage to calculate the actual voltage between the live output power line 280 and the neutral power line 222. This exemplary voltage detection circuit 240 includes an op-amp IC1D, and associated resistors and capacitors. The voltage detection circuit 240 also includes a network of diodes and capacitors at the output of the op-amp IC1D for protecting the microprocessor 205 from voltage ranges above or below the scaled range of 0-5 VAC. Exemplary values for the components of the voltage detection circuit 240 are listed below in Table 2.

TABLE 2

Exemplary Component Values for the Voltage Detection Circuit 240

| Circuit Component | Value |
|---|---|
| R8 | 39 kΩ |
| R9 | 82 kΩ |
| R10 | 1 kΩ |
| R11 | 100 kΩ |
| C1 | 1 nF |
| C2 | 1 nF |
| C3 | 100 nF |

Figure 4A:
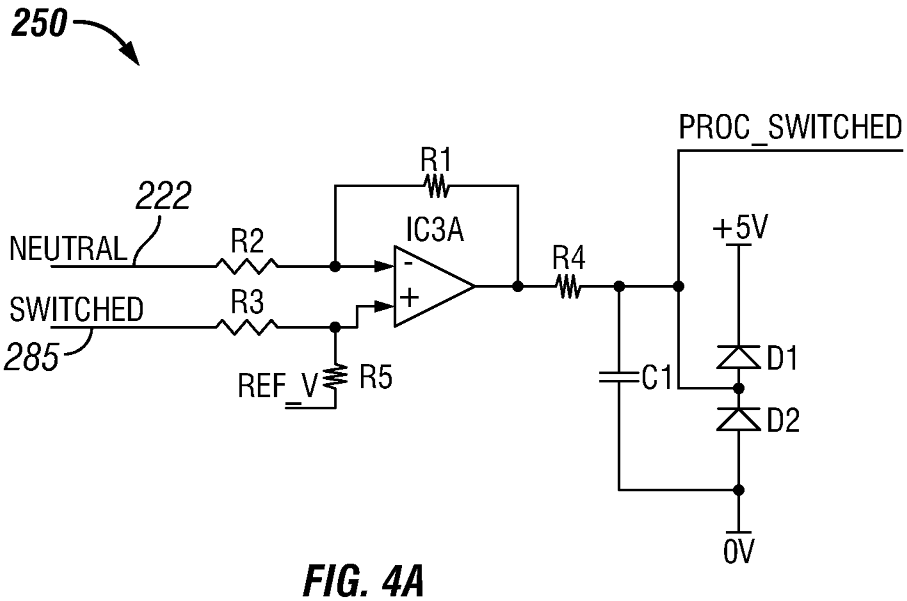
FIGS. 4A and 4B are electrical circuit diagrams depicting voltage detection circuits of a line voltage dimming card in accordance with one exemplary embodiment of the present invention.
Figure 4B:
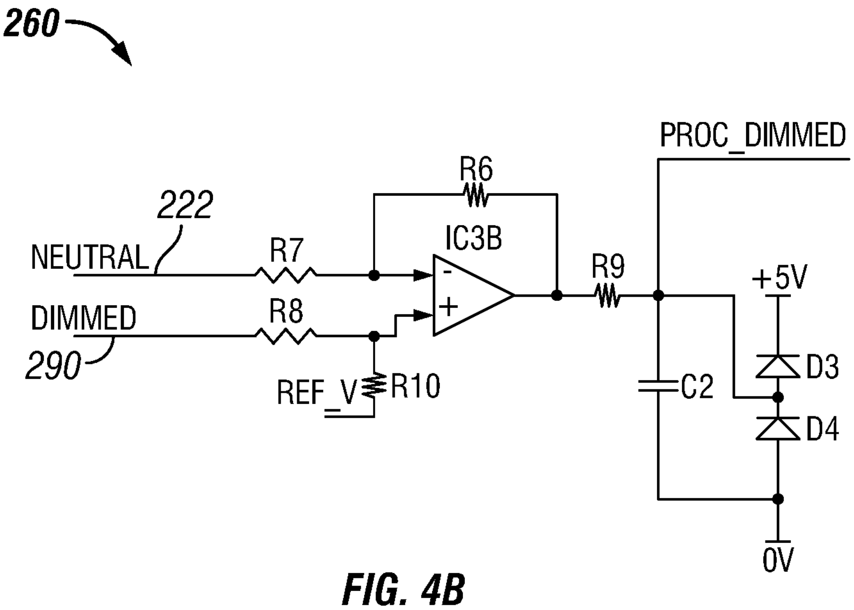

FIGS. 4A and 4B, collectively FIG. 4, are electrical circuit diagrams depicting exemplary voltage detection circuits 250, 260 of a line voltage dimming card 130 in accordance with the exemplary embodiment of FIG. 2. Referring to FIG. 4A, the voltage detection circuit 250 scales the AC signal received across the switched output power line 285 and the neutral power line 222 and provides this scaled signal PROC_SWITCHED to the microprocessor 205. The microprocessor 205 compares this scaled signal PROC_SWITCHED to a reference voltage to determine the actual voltage between the switched output power line 285 and the neutral power line 222. This exemplary voltage detection circuit 250 includes an op-amp IC3A, and associated resistors and capacitors. The voltage detection circuit 250 also includes a network of diodes and capacitors at the output of the op-amp IC3A for protecting the microprocessor 205 from voltage ranges above or below the scaled range of 0-5 VAC. Exemplary values for the components of the voltage detection circuit 250 are listed below in Table 3.

TABLE 3

| Exemplary Component Values for the Voltage Detection Circuit 250 | |
|---|---|
| Circuit Component | Value |
| R1 | 4.7 kΩ |
| R2 | 990 kΩ |
| R3 | 990 kΩ |
| R4 | 1 kΩ |
| R5 | 4.7 kΩ |
| C1 | 100 nF |

Referring to FIG. 4B, the exemplary voltage detection circuit 260 scales the AC signal received across the dimmed output power line 290 and the neutral power line 222 and provides this scaled signal PROC_DIMMED to the microprocessor 205. The microprocessor 205 compares this scaled signal PROC_DIMMED to a reference voltage to calculate the actual voltage between the dimmed output power line 290 and the neutral power line 222. This exemplary voltage detection circuit 260 includes an op-amp IC3B, and associated resistors and capacitors. The voltage detection circuit 260 also includes a network of diodes and capacitors at the output of the op-amp IC3B for protecting the microprocessor 205 from voltage ranges above or below the scaled range of 0-5 VAC. Exemplary values for the components of the voltage detection circuit 260 are listed below in Table 4.

TABLE 4

| Exemplary Component Values for the Voltage Detection Circuit 260 | |
|---|---|
| Circuit Component | Value |
| R6 | 4.7 kΩ |
| R7 | 990 kΩ |
| R8 | 990 kΩ |
| R9 | 1 kΩ |
| R10 | 4.7 kΩ |
| C2 | 100 nF |

Figure 5:
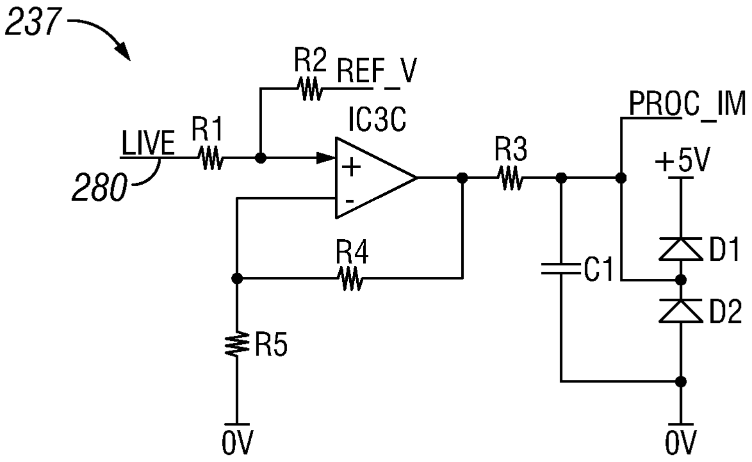
FIG. 5 is an electrical circuit diagram depicting an analog amplifier circuit of a line voltage dimming card in accordance with one exemplary embodiment of the present invention.

FIG. 5 is an electrical circuit diagram depicting an exemplary analog amplifier circuit 237 of a line voltage dimming card 130 in accordance with the exemplary embodiment of FIG. 2. This exemplary analog amplifier circuit 237 includes an op-amp IC3C which scales a voltage measurement taken across a current sensing resistor R44 (See FIG. 7). This voltage measurement is scaled by the op-amp IC3C and this scaled signal PROC_IM is transmitted to the microprocessor 205. The microprocessor 205 compares the scaled signal PROC_IM to a reference voltage to determine the current flowing through the resistor R44 and thus through the lighting circuit that the line voltage dimming card 130 controls. Exemplary values for the components of the analog amplifier circuit 237 are listed below in Table 5.

TABLE 5

| Exemplary Component Values for the Analog Amplifier Circuit 237 | |
|---|---|
| Circuit Component | Value |
| R1 | 10 kΩ |
| R2 | 150 kΩ |
| R3 | 1 kΩ |
| R4 | 150 kΩ |
| R5 | 10 kΩ |
| C1 | 100 nF |

Figure 6:
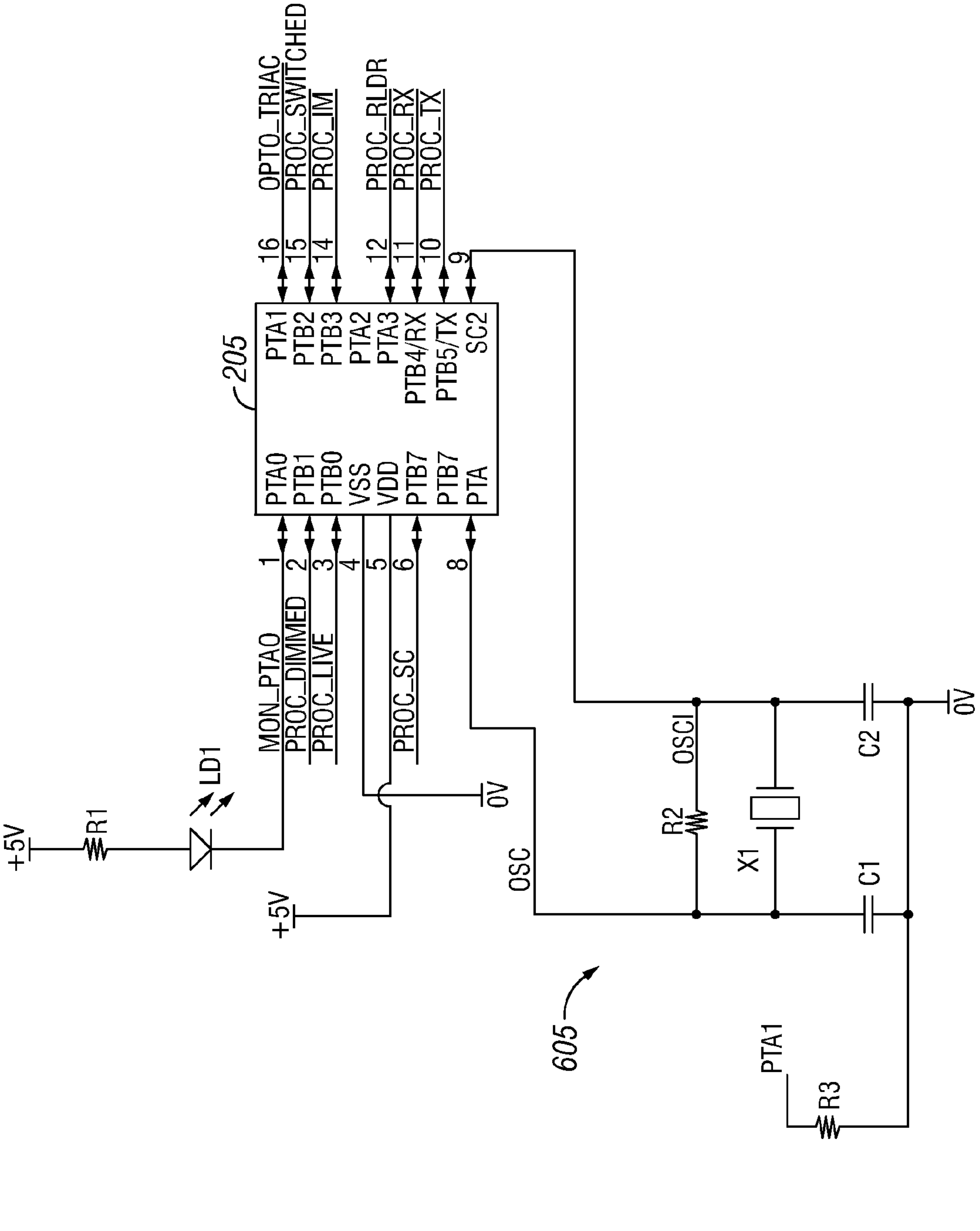
FIG. 6 is an electrical circuit diagram depicting a microprocessor circuit of a line voltage dimming card in accordance with one exemplary embodiment of the present invention.

FIG. 6 is an electrical circuit diagram depicting an exemplary microprocessor 205 circuit of a line voltage dimming card 130 in accordance with the exemplary embodiment of FIG. 2. In one exemplary embodiment, the microprocessor 205 includes 16 pins for sending or receiving electrical signals. A description of the signal at each pin of the microprocessor 205 is described below in Table 6. This exemplary microprocessor 205 circuit includes a light emitting diode (LED) LD1, a clock circuit 605, and associated resistors and capacitors. This clock circuit 605 employs a crystal oscillator X1 to provide a reference clock signal to the microprocessor 205. Exemplary values for the components of the microprocessor circuit 205 are listed below in Table 7.

TABLE 6

| Microprocessor 205 Input/Output Pins | |
|---|---|
| Pin Number | Description |
| 1 | Status indication. |
| 2 | Receives voltage measurement signal PROC_DIMMED from the voltage detection circuit 260. |
| 3 | Receives voltage measurement signal PROC_LIVE from the voltage detection circuit 240. |
| 4 | OV input. |
| 5 | +5V input. |
| 6 | Receives square-wave output signal PROC_SC from the zero cross circuit 230. |
| 7 | Not used. |
| 8 | Receives clock input signal from oscillator X1. |
| 9 | Receives clock input signal from oscillator X1. |
| 10 | Outputs a communication signal to the serial communications circuit 212. |
| 11 | Receives a communication signal from the serial communications circuit 212. |
| 12 | Outputs signal to operate the relay 247. |
| 13 | Not used. |
| 14 | Receives voltage measurement signal PROC_IM from athe analog amplifier circuit 237. |
| 15 | Receives voltage measurement signal PROC_SWITCHED from the voltage detection circuit 250. |
| 16 | Sends dimming control signal to the dimmer drive circuit 255. |

TABLE 7

| Exemplary Component Values for the Microprocessor 205 Circuit | |
|---|---|
| Circuit Component | Value |
| R1 | 330 Ω |
| R2 | 4.7 MΩ |
| R3 | 10 kΩ |
| C1 | 22 pF |
| C2 | 22 pF |

Figure 7:
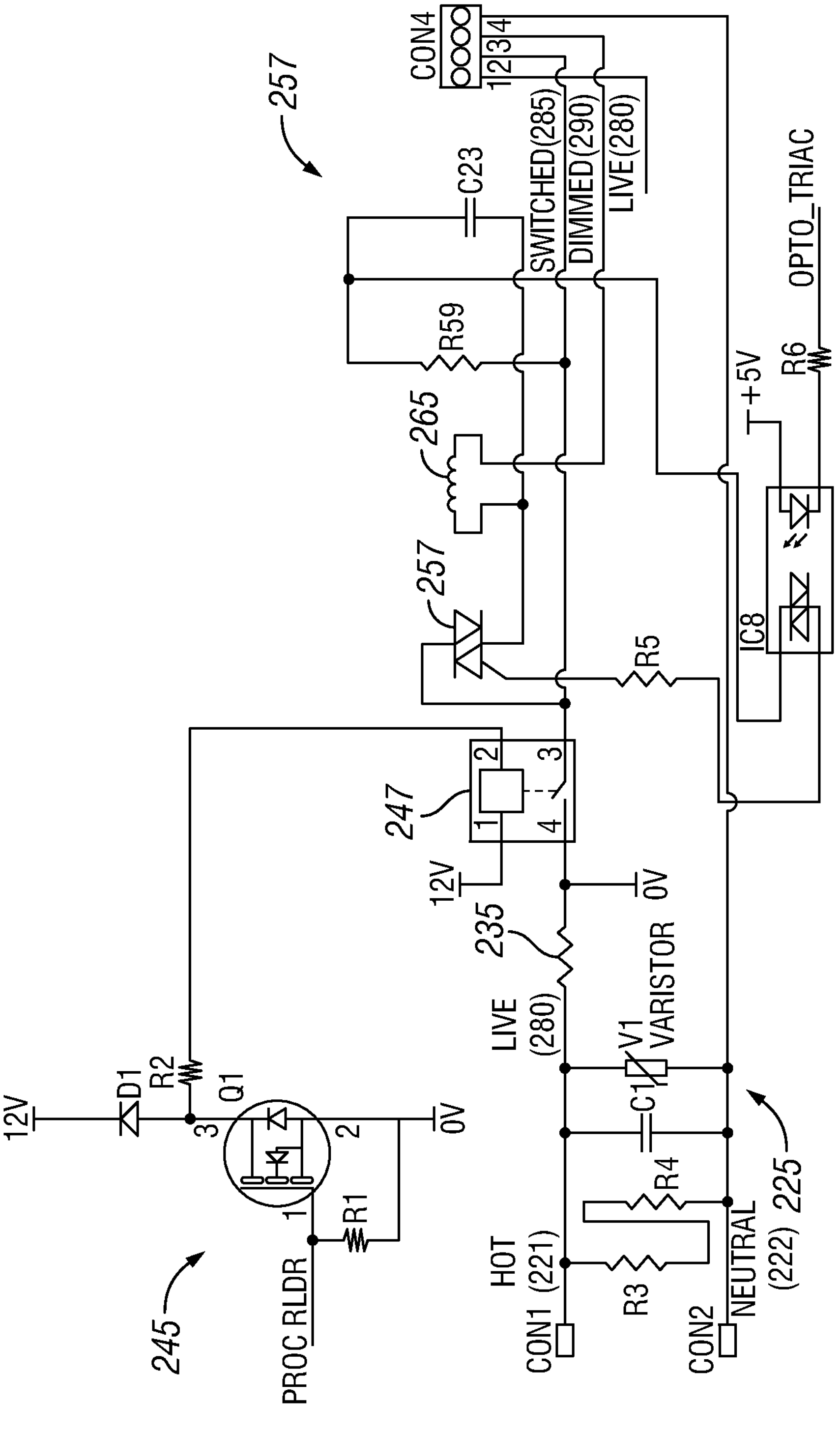
FIG. 7 is an electrical circuit diagram depicting a surge protection circuit, a relay, a relay drive circuit, and a dimmer circuit of a line voltage dimming card in accordance with one exemplary embodiment of the present invention.

FIG. 7 is an electrical circuit diagram depicting examples of a surge protection circuit 225, a relay 247, a relay drive circuit 245, a dimmer drive circuit 255, and a triac dimmer 257 of a line voltage dimming card 130 in accordance with the exemplary embodiment of FIG. 2. The hot power line 221 and the neutral power line are connected to the line voltage dimming card 130 at connectors CON1 and CON2 respectively. The output power lines 280, 285, and 290 are connected to connector CON3 to receive power for a light source.

The surge protection circuit 225 includes a capacitor C9 and a varistor V1. The varistor V1 acts to divert any voltage surges present along the hot line 221 in order to protect the circuitry in the line voltage dimming card 130.

The relay drive circuit 245 includes a field effect transistor (FET) Q2 for controlling the relay 247. The relay drive circuit 245 receives a control signal PROC_RLDR from the microprocessor 205 and opens or closes the relay 247 based on this control signal PROC_RLDR. The control signal PROC_RLDR is applied to the base 1 of the FET Q2 which allows current flow through a channel between points 2 and 3 of the FET Q2 when the PROC_RLDR signal is above a threshold voltage. This flow of current drives a coil in relay 247 to close. In one exemplary embodiment, without this flow of current, the relay 247 remains open.

The dimmer drive circuit 255 includes an optoisolator triac driver IC8, two resistors R5, R7, and a capacitor C2. The triac driver IC8 receives a dimmer controller signal OPTO_TRIAC from the microprocessor 205. Based on the dimmer control signal OPTO_TRIAC, the triac driver IC8 energizes the dimmer 257 to allow current to flow from the switched output power line 285 through the dimmer 257, through an inductor 265, and to the dimmed output power line 290 at CON3. As the triac dimmer 257 and the inductor 265 can be large devices, in a panel embodiment, these devices 257, 265 can be mounted external from the line dimming voltage card 130. Exemplary values for the components of the surge protection circuit 225, the relay drive circuit 245, and the dimmer drive circuit 255 are listed below in Table 8.

TABLE 8

Exemplary Component Values for the Surge Protection Circuit 225, the Relay Drive Circuit 255, and the Dimmer Drive Circuit 255

| Circuit Component | Value |
|---|---|
| R1 | 1 MΩ |
| R2 (thermistor) | Variable proportional to temperature |
| R3 | 1 MΩ |
| R4 | 1 MΩ |
| R5 (thermistor) | Variable proportional to temperature |
| R6 (thermistor) | Variable proportional to temperature |
| R7 (thermistor) | Variable proportional to temperature |
| C1 | 1 μF |
| C2 | 100 nF |

Figure 8:
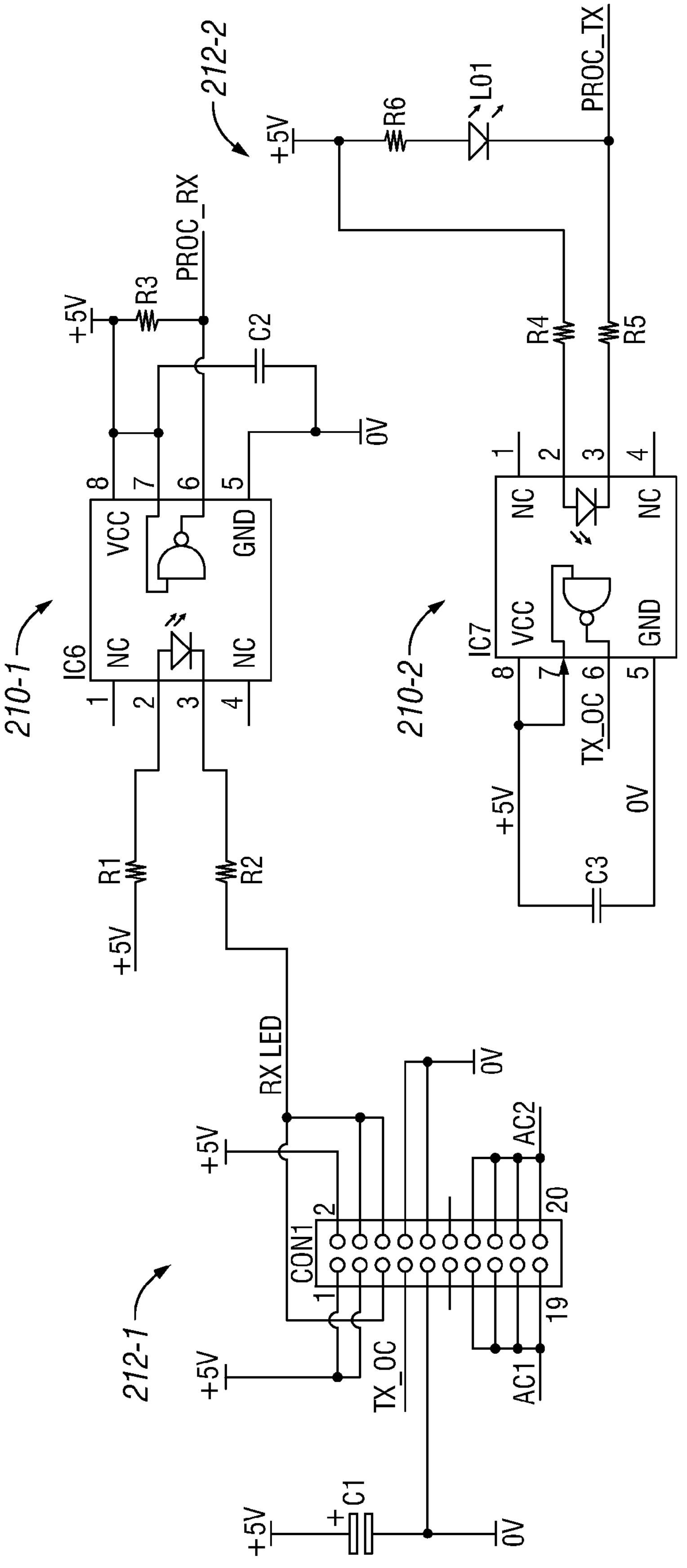
FIG. 8 is an electrical circuit diagram depicting communication circuits and optical isolation circuits of a line voltage dimming card in accordance with one exemplary embodiment of the present invention.

FIG. 8 is an electrical circuit diagram depicting exemplary serial communication circuits 212-1, 212-2 and exemplary optical isolation circuits 210-1, 210-2 of a line voltage dimming card 130 in accordance with the exemplary embodiment of FIG. 2. The exemplary serial communication circuits 212-1 and 212-2 provide serial communications between the microprocessor 205 and the panel controller 105.

The serial communication circuit 212-1 receives a serial communication signal TX_OC at connector CON1 and transfers the signal TX_OC to the optical isolation circuit 210-1, which in turn transfers a representative signal PROC_RX to the microprocessor 205. The optical isolation circuit 210-1 includes an optocoupler 106 which provides electrical isolation between the panel controller 105 and the microprocessor 205 for the serial communication signals PROC_RX and TX_OC. The serial communications circuit 212-1 and the optical isolation circuit 210-1 includes two capacitors C20, C40 and three resistors R52, R54, R63.

The serial communication circuit 212-2 receives a serial communication signal PROC_TX from the microprocessor 205 and transfers the signal PROC_TX to the optical isolation circuit 210-2 which in turn transfers a representative signal TX_OC to the panel controller 105. The optical isolation circuit 210-2 includes an optocoupler IC7 which provides electrical isolation between the panel controller 105 and the microprocessor 205 for the serial communication signals PROC_TX and TX_OC. The serial communications circuit 212-2 and optical isolation circuit includes a capacitor C21 and three resistors R55, R61, R62. Exemplary values for the components of the serial communication circuits 212-1, 212-1 and the optical isolation circuits 210-1, 210-2 are listed below in Table 9.

TABLE 9

Exemplary Component Values for the Serial Communication Circuits 212-1, 212-2, and the Optical Isolation Circuits 210-1 and 210-2

| Circuit Component | Value |
|---|---|
| R1 (thermistor) | Variable proportional to temperature |
| R2 (thermistor) | Variable proportional to temperature |
| R3 | 3.3 kΩ |
| R4 (thermistor) | Variable proportional to temperature |
| R5 (thermistor) | Variable proportional to temperature |
| R6 (thermistor) | Variable proportional to temperature |
| C1 | 100 nF |
| C2 | 100 nF |
| C3 | 47 μF |

Figure 9:
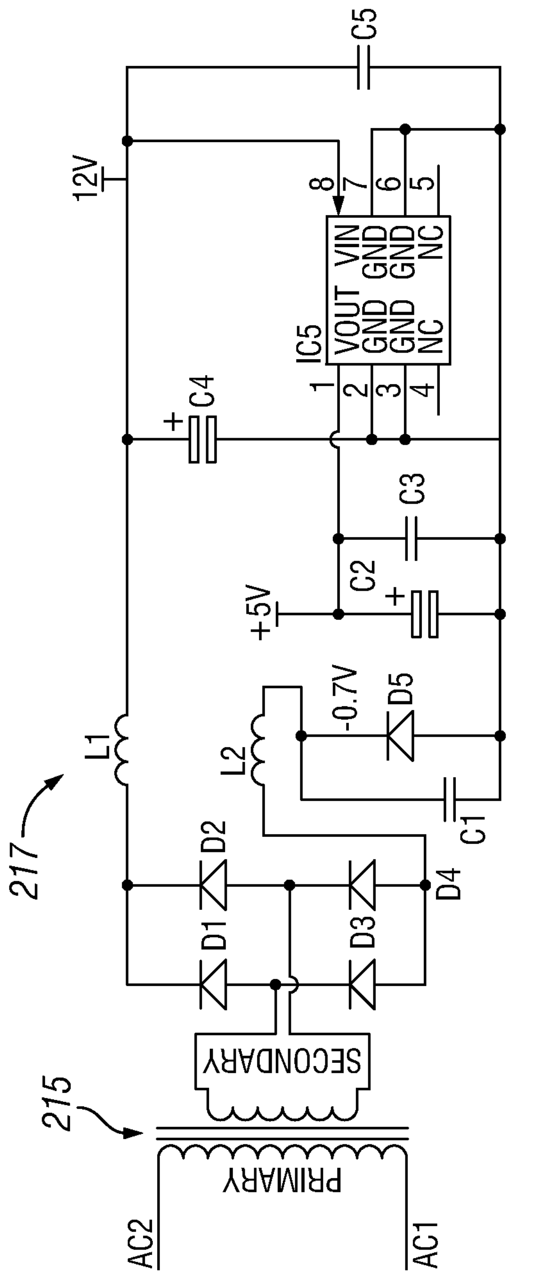
FIG. 9 is an electrical circuit diagram depicting a power supply circuit of a line voltage dimming card in accordance with one exemplary embodiment of the present invention.

FIG. 9 is an electrical circuit diagram depicting examples of a transformer 215 and a power supply circuit 217 of a line voltage dimming card 130 in accordance with the exemplary embodiment of FIG. 2. In this exemplary embodiment, the transformer 215 receives AC power from the panel controller 105 (See FIG. 1) and steps the input voltage down to an appropriate voltage level for the power supply circuit 217. The power supply circuit 217 receives the stepped down voltage from the transformer 215 and employs a voltage regulator IC5 to provide a steady DC voltage to the microprocessor 205. This exemplary power supply circuit 217 includes a rectifier circuit having four diodes D9, D10, D11, D12 connected across the secondary winding of the transformer 215. This rectifier circuit converts the AC voltage received on the secondary windings of the transformer 215 into a DC voltage. The power supply circuit 217 also includes associated inductors, resistors, capacitors, and a diode D8. Exemplary values for the components of the power supply circuit 217 are listed below in Table 10.

TABLE 10

Exemplary Component Values for the Power Supply Circuit 217

| Circuit Component | Value |
|---|---|
| C1 | 100 nF |
| C2 | 47 μF |
| C3 | 100 nF |
| C4 | 47 μF |

TABLE 10-continued

| Exemplary Component Values for the Power Supply Circuit 217 | |
|---|---|
| Circuit Component | Value |
| C5 | 100 nF |
| L1 | 22 μH |
| L2 | 22 μH |

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A lighting control system, comprising:

a lighting control circuit of a plurality of lighting control circuits operable to receive a control signal comprising a command to energize a light source and allow electrical energy to flow to the light source in response to the command;

a panel controller communicably coupled to the plurality of lighting control circuits, wherein the panel controller is operable to transmit the control signal to the lighting control circuit; and a power metering circuit communicably coupled to the lighting control circuit and comprising:

a first meter operable to measure a first power usage of a first portion of the lighting control circuit; and a second meter operable to measure a second power usage of a second portion of the lighting control circuit, wherein the lighting control circuit is electrically coupled to the light source, wherein the lighting control circuit is operable to control the light source and the at least one other light source, wherein the first power usage and the second power usage are made available to a building management system, wherein the panel controller is operable to send a subsequent control signal comprising a subsequent command to the lighting control circuit based on the first power usage measured by the first meter and the second power usage measured by the second meter, and wherein the light source and the at least one other light source comprises at least two selected from a group consisting of fluorescent, incandescent, magnetic low voltage, electronic low voltage, light emitting diode (LED), high intensity discharge (HID), neon, and cold cathode light sources.

2. The lighting control system of claim 1, wherein the lighting control circuit comprises a microprocessor operable to receive the control signal and transmit an electrical signal allowing the flow of electrical energy to the light source in response to the command.

3. The lighting control system of claim 1, wherein the control signal further comprises an intensity setting for the light source.

4. The lighting control system of claim 3, wherein the lighting control circuit adjusts the intensity level of the light source by sequentially allowing and blocking the flow of electrical energy to the light source at a frequency.

5. The lighting control system of claim 4, wherein the control circuit comprises a triac operable to sequentially allow and block the flow of electrical energy to the light source at the frequency.

6. The lighting control system of claim 1, wherein the power metering circuit further comprises:

at least one voltage detection circuit; and a current measurement circuit.

7. The lighting control system of claim 6, further comprising a user interface communicably coupled to the panel controller, wherein the panel controller transmits a representation of the amount of electrical energy used by the light source to the user interface for outputting to a user.

8. The lighting control system of claim 1, wherein the light source comprises an electronic dimming ballast.

9. The lighting control system of claim 8, further comprising a low voltage dimming circuit communicably coupled to the electronic dimming ballast and operable to transmit a dimming level signal to the electronic dimming ballast, wherein the command comprises an intensity setting for the light source and wherein the dimming level signal corresponds to the intensity setting.

10. The lighting control system of claim 9, wherein the dimming level signal comprises a variable analog voltage level.

11. The lighting control system of claim 9, wherein the dimming level signal comprises a digital signal.

12. A lighting circuit control card for use with a plurality of types of lighting sources, comprising:

a control circuit, electrically coupled to at least one light source, the control circuit operable to receive a control signal comprising an indication that the at least one light source should be energized and operable to permit electrical energy to flow to the at least one light source in response to the indication; and a power metering circuit comprising a first meter operable to determine a first power usage of a first portion of the control circuit and a second meter operable to determine a second power usage of a second portion of the control circuit, wherein the control circuit is operable to control the at least one light source and the at least one other light source, wherein the first power usage and the second power usage are made available to a building management system, wherein the control circuit is operably coupled to a panel controller, wherein the panel controller is operable to send the control signal, wherein the control signal comprises a command to the control circuit based on the first power usage determined by the first meter and the second power usage determined by the second meter, wherein the control circuit is operable to receive a subsequent control signal based on the first power usage measured by the first meter and the second power usage measured by the second meter, and wherein the at least one light source and the at least one other light source comprises at least two selected from a group consisting of fluorescent, incandescent, magnetic low voltage, electronic low voltage, light emitting diode ("LED"), high density discharge ("HID"), neon, and cold cathode light sources.

13. The lighting circuit control card of claim 12, wherein the power metering circuit further comprises:

at least one voltage detection circuit; and a current detection circuit.

14. The lighting circuit control card of claim 12, wherein the control signal further comprises a desired intensity level and wherein the control circuit adjusts an intensity level of the at least one light source based on the desired intensity level.

15. The lighting circuit control card of claim 14, wherein the control circuit adjusts the intensity level of the at least one light source by sequentially allowing and blocking the flow of electrical energy to the at least one lighting source.

16. The lighting circuit control card of claim 15, wherein the control circuit further comprises a triac, wherein the triac sequentially allows and blocks the flow of electrical energy to the at least one light source at a frequency.

17. A method for controlling a light source, the method comprising the steps of:

receiving from a panel controller a control signal at a lighting control circuit, the control signal comprising a command to energize the light source and a desired intensity level for the light source;

in response to receiving the control signal, allowing, by the lighting control circuit, electrical energy to flow to the light source;

measuring, using a first meter of a power metering circuit communicably coupled to the lighting control circuit, a first power usage of a first portion of the lighting control circuit;

measuring, using a second meter of the power metering circuit communicably coupled to the lighting control circuit, a second power usage of a second portion of the lighting control circuit; and receiving, from the panel controller based on the first power usage measured by the first meter and the second power usage measured by the second meter, a subsequent control signal at the lighting control circuit, wherein the lighting control circuit is operable to control the light source and at least one other light source, wherein the first power usage and the second power usage are made available to a building management system, wherein the light source and the at least one other light source comprises at least two selected from a group consisting of fluorescent, incandescent, magnetic low voltage, electronic low voltage, light emitting diode ("LED"), high density discharge ("HID"), neon, and cold cathode light sources.

18. The method of claim 17, wherein the step of allowing electrical energy to flow to the light source comprises sequentially allowing and blocking the flow of electrical energy to the light source at a frequency corresponding to the desired intensity level.

19. The method of claim 18, wherein the lighting control circuit comprises a microprocessor and a triac and wherein the triac receives a signal from the microprocessor and in response to the signal, the triac allows electrical energy to flow to the light source for a period of time corresponding to the frequency.

20. The method of claim 17, further comprising the step of transmitting a representation of the amount of electrical energy used by the light source to a user interface for outputting to a user.

21. The method of claim 17, further comprising the step of receiving the control signal at a panel controller from a source external to the panel controller and the lighting control circuit, wherein the control signal is received from the panel controller.

22. The method of claim 21, wherein the building management system comprises the source external to the panel controller and the lighting source.

23. The method of claim 17, further comprising the step of receiving configuration information for the lighting control circuit, wherein the configuration information comprises a high power limit and a low power limit for the lighting source.

24. The method of claim 23, further comprising the step of adjusting, based on the first power usage measured by the first meter, the intensity of the light source using the configuration information for the lighting control circuit.

25. A lighting system, comprising:

a lighting controller operable to send control signals to line voltage dimming cards;

one or more line voltage dimming cards communicably coupled to the lighting controller, each line voltage dimming card comprising:

a control circuit, electrically coupled to a lighting circuit comprising at least one light source, the control circuit operable to receive a control signal comprising an indication that the at least one light source should be energized and a desired intensity level for the at least one light source, the control circuit further operable to permit electrical energy to flow to the at least one light source in response to the indication and control an intensity level of the at least one light source in response to the desired intensity level; and a power metering circuit comprising at least a first meter operable to determine a first power usage of a first portion of the control circuit and a second meter operable to determine a second power usage of a second portion of the control circuit; and a user interface communicably coupled to the lighting controller and operable to receive configuration information for the lighting controller and the one or more line voltage dimming cards and further operable to output a representation of the amount of electrical power consumed by the at least one light source from the lighting controller, wherein each of the line voltage dimming cards is operable to control the at least one light source and at the least one other light source, wherein the first power usage and the second power usage are made available to a building management system, wherein the control circuit is operable to receive, from the lighting controller based on the first power usage measured by the first meter and the second power usage measured by the second meter, a subsequent control signal, and wherein the at least one light source and the at least one other light source comprises at least two selected from a group consisting of fluorescent, incandescent, magnetic low voltage, electronic low voltage, light emitting diode ("LED"), high density discharge ("HID"), neon, and cold cathode light sources.

26. The lighting system of claim 25, wherein the lighting controller is further operable to receive control signals from a controller via a network.

27. The lighting system of claim 25, further comprising one or more low voltage dimming cards communicably coupled to the lighting controller, each line voltage dimming card operable to transmit a dimming control signal corresponding to the desired intensity level to a light source having an electronic dimming ballast.

28. The lighting system of claim 25, wherein the control circuit controls the intensity level of the at least one light source by energizing and de-energizing the at least one light source at a frequency corresponding to the desired intensity level.

29. The lighting system of claim 28, wherein the control circuit comprises a zero cross circuit for timing the energizing and de-energizing of the at least one light source.

30. The lighting system of claim 25, wherein each of the line voltage dimming cards is operable for use with each of fluorescent, incandescent, and LED light sources without modification to any hardware of the line voltage dimming card.

31. The lighting system of claim 25, wherein the amount of electrical power consumed by the at least one light source is measured using a plurality of voltage detection circuits comprising a first voltage detection circuit, a second first voltage detection circuit, and a third first voltage detection circuit.

32. The lighting system of claim 31, wherein the first voltage detection circuit measures with the first meter a first voltage across a live voltage point and a neutral power line, wherein the second voltage detection circuit measures with the second meter a second voltage across a switched point and the neutral line, and wherein the third voltage detection circuit measures with at least one other meter a third voltage across a dimmed point and the neutral line.

* * * * *